(12) United States Patent
Yoshida et al.

(10) Patent No.: US 8,226,377 B2
(45) Date of Patent: Jul. 24, 2012

(54) SEALING PUMP-UP DEVICE

(75) Inventors: Masaki Yoshida, Kodaira (JP); Yusuke Inoue, Kodaira (JP); Yuji Takeda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 885 days.

(21) Appl. No.: 12/305,888

(22) PCT Filed: Jun. 13, 2007

(86) PCT No.: PCT/JP2007/061938
§ 371 (c)(1),
(2), (4) Date: Dec. 19, 2008

(87) PCT Pub. No.: WO2007/148587
PCT Pub. Date: Dec. 27, 2007

(65) Prior Publication Data
US 2010/0189575 A1    Jul. 29, 2010

(30) Foreign Application Priority Data

Jun. 20, 2006  (JP) .................................. 2006-169632

(51) Int. Cl.
F04F 5/00  (2006.01)
(52) U.S. Cl. ...................................................... 417/151
(58) Field of Classification Search .................. 417/313, 417/151; 141/38
See application file for complete search history.

(56) References Cited

U.S. PATENT DOCUMENTS

| | | | | | |
|---|---|---|---|---|---|
| 3,256,005 A | * | 6/1966 | Taylor | ........................ | 267/64.13 |
| 4,276,898 A | * | 7/1981 | Ross | .............................. | 137/231 |
| 4,308,766 A | * | 1/1982 | Myers, Jr. | ...................... | 81/15.6 |
| 2008/0230142 A1 | * | 9/2008 | Hickman | ......................... | 141/38 |

FOREIGN PATENT DOCUMENTS

| | | |
|---|---|---|
| JP | 2005-199618 A | 7/2005 |
| JP | 2007-168418 A | 7/2007 |
| WO | 2007/063852 A1 | 6/2007 |

\* cited by examiner

*Primary Examiner* — Toan Ton
*Assistant Examiner* — Zachary Snyder
(74) *Attorney, Agent, or Firm* — Sughrue Mion, PLLC

(57) ABSTRACT

When a press jig is inserted into a jig insertion hole, an O-ring attached to the outer peripheral surface of the press jig is prevented from being caught on an air supply port opening to the inner peripheral surface of the jig insertion hole and damaged. In a sealing pump-up device 10, the opening diameter of an air supply port 58 opening to the inner peripheral surface of a jig insertion hole 44 provided at one end of an air supply path 60 is set smaller than the strand diameters of an O-ring 72 and an O-ring 96. Consequently, the width at the edge of the air supply ports 58 on which the O-rings 72, 96 may possibly be caught can be made sufficiently smaller than the strand diameter of the O-rings 72, 96. When the O-rings 72, 96 pass on the inner peripheral side of the air supply ports 58 in a state of press contact with the inner peripheral surface of the jig insertion hole 44, the amount by which the O-rings 72, 96 are deformed (restored) in order to swell to the outer peripheral side so that a portion thereof fits into the air supply ports 58, can be reduced sufficiently.

10 Claims, 4 Drawing Sheets

SEALING PUMP-UP DEVICE

TECHNICAL FIELD

The present invention relates to a sealing pump-up device for sealing a punctured pneumatic tire by injecting a sealing agent into the pneumatic tire, and also for supplying compressed air into a pneumatic tire, raising the pressure of the pneumatic tire.

RELATED ART

Sealing pump-up devices have recently become popular in which, when a pneumatic tire (referred to below simply as tire) punctures, instead of changing the tire or the wheel, the tire is repaired with a sealing agent and then pumped up to the specified internal pressure. Known examples of such types of sealing pump-up device are, for example, described in Japanese Patent Application Laid-Open (JP-A) No. 2005-199618.

The sealing pump-up device shown in JP-A No. 2005-199618 is provided with a liquid container in which a sealing agent is stored and which has an outlet for exchangeably mounting a housing unit closed off with a piercable cap, and a unit body provided with a housing having a tubular body portion and with a piston shaped switching component (a press jig) disposed movably within the body portion. A flow inlet port (air supply port) communicating with a compressed air source and an ejection port communicating with a tire are provided to the body portion of the housing. In addition the press jig is capable of moving within the body portion from a position (retreated position) separated from the cap member to a position (piercing position) for piercing the cap member with a leading end piercing portion.

In the sealing pump-up device described in JP-A No. 2005-199618 when the switching component is in the retreated position, the flow inlet port is in communication with an ejection port through a main communication path formed in the switching component, and compressed air supplied from the compressed air source to within the body portion is supplied into the tire.

In the sealing pump-up device of JP-A No. 2005-199618, compressed air, supplied from the compressed air source to within the body portion through the main communication path of the press jig, is supplied into the liquid container when the press jig is in the piercing position. Thereby the static pressure of the air accumulation formed within the liquid container pushes the sealing agent out from the outlet, and the sealing agent is supplied into the tire through a gap formed between the inner peripheral surface of the body portion and the outer peripheral surface of the press jig, and through the ejection port.

In the sealing pump-up device described in JP-A No. 2005-199618 the liquid container is configured with an operation portion for operating the press jig, and in the state in which the press jig is in the retreated position, an operator pushes the liquid container in downwards, and the press jig is moved upwards relative to the liquid container by this pressing force and reaches the piercing position.

However, in a sealing pump-up device such as the one described above, if a gap is generated between the inner peripheral surface of the housing and the outer peripheral surface of the press jig then there is a danger that compressed air, supplied from the air supply port opened to the inner peripheral surface of the housing through this gap, leaks out to within the liquid container, or that sealing agent leaks out from within the liquid container to outside of the unit body. In order to prevent such problems in sealing pump-up devices such as described above there is usually a grooved portion formed extending in a circumferential direction at the leading end side of the outer peripheral surface of the press jig, and a rubber O-ring is fitted in the grooved portion. The space between the inner peripheral surface of the housing and the outer peripheral surface of the press jig is sealed by the compressed state of this O-ring against the inner peripheral surface of the housing.

DISCLOSURE OF THE INVENTION

Problem to be Solved by the Invention

However, if an O-ring is fitted in the grooved portion formed to the outer peripheral surface of the press jig as described above, when the press jig is moved from the retreat position to the piercing position, part-way through the movement of the press jig the O-ring passes the inner peripheral side of the air supply port, opening to the inner peripheral surface of the housing. When this occurs the O-ring sometimes catches on a peripheral edge portion (edge portion) of the air supply port at the inner peripheral surface of the housing, with damage such as breakage occurring to the O-ring. If the O-ring breaks then the compressed air becomes turbulent due to the compressed air supplied from the air supply port leaking out into the liquid container, and air bubbles become mixed into the sealing agent within the liquid container. Clogging readily occurs of the sealing agent within the tire valve of small flow path cross-sectional area due to supply of sealing agent with air bubbles mixed therein through the tire valve into the tire. Supply of sealing agent being supplied from the liquid container through the outlet becomes unstable, since sealing agent leaks out from within the liquid container to outside of the unit body.

In the light of the above circumstances an object of the present invention is to provide a sealing pump-up device able to effectively prevent damage to an O-ring, fitted to the outer peripheral surface of a press jig, due catching on an air supply port opening to the inner peripheral surface of a jig insertion hole when the press jig moves within the jig insertion hole.

Method of Solving the Problem

The sealing pump-up device according to a first aspect of the present invention includes:
a liquid container for storing a sealing agent, the liquid container also formed with an ejection port for ejecting the sealing agent; an injection unit configured with a liquid supply chamber that is in communication with the ejection port and is on the opposite side of the ejection port to the inside of the liquid container, with the ejection port interposed between the liquid supply chamber and the liquid container; a jig insertion hole configured in the injection unit and in communication with the outside of the injection unit and with the liquid supply chamber; an air supply path configured with a first end opening so as to face inside the jig insertion hole and with the other end connected to an air supply source for supplying compressed air; an air-liquid supply tube with a first end connected to the liquid supply chamber and the other end connectable to a valve of a pneumatic tire; a press jig of a pillar shape, movable within the jig insertion hole of the injection unit; a jig communication passage configured in the press jig, with a first end opening at the leading end side of the press jig and another end opening at the outer peripheral surface of the press jig, when the press jig moves within the jig insertion hole the first end being in communication with the inside of the liquid container and the other end being connected to the air supply path; an O-ring, fitting to a groove formed at the leading end side of the outer peripheral surface of the press jig and sealing between the outer peripheral surface of the press jig and the inner peripheral surface of the jig insertion hole when the press jig is in an inserted state within the jig insertion hole; an air supply port provided to the first end of the air supply path, opening to the inner peripheral surface of the jig insertion hole and also being of an opening diameter smaller than a strand diameter of the O-ring.

In the sealing pump-up device according to the first aspect of the present invention, the O-ring is fitted to the groove formed at the leading end side of the outer peripheral surface of the press jig. Compressed air supplied from the air supply ports can be prevented from leaking out to within the liquid container through the space between the inner peripheral surface of the jig insertion hole and the outer peripheral surface of the press jig due to the O-ring sealing between the outer peripheral surface of the press jig and the inner peripheral surface of the jig insertion hole when the press jig is in an inserted state within the jig insertion hole. Hence such compressed air can be prevented from mixing in as bubbles into the sealing agent, and the sealing agent from inside the liquid container can also be effectively prevented from leaking out to outside of the injection unit In the sealing pump-up device according to the first aspect of the present invention, the opening diameter of the air supply port, provided to the first end of the air supply path and opening to the inner peripheral surface of the jig insertion hole, is made smaller than the strand diameter of the O-ring. Consequently, the width at the edge of the air supply port on which the O-ring may possibly be caught can be made sufficiently smaller than the strand diameter of the O-ring. When the O-ring passes on the inner peripheral side of the air supply port in a state of press contact with the inner peripheral surface of the jig insertion hole, the amount by which the O-ring is deformed (restored) in order to swell to the outer peripheral side so that a portion thereof fits into the air supply port, can be reduced sufficiently. Hence the occurrence of damage to the O-ring fitted to the press jig by catching on the air supply port at the inner peripheral surface of the jig insertion hole when the press jig is inserted into the jig insertion hole can be effectively prevented.

The sealing pump-up device of a second aspect is the sealing pump-up device of the first aspect, wherein the internal diameter of the other end side of the air supply path is made bigger in diameter than the O-ring strand diameter, and also a restricted portion is provided to the first end of the air supply path to reduce the internal diameter relative to the other end side of the air supply path, the air supply port being at a first end of the restricted portion.

The sealing pump-up device of a third aspect is the sealing pump-up device of the second aspect, wherein a plurality of the restricted portions are provided at the first end of the air supply path, and one of the air supply ports is provided at each of the first ends of the plurality of restricted portions.

The sealing pump-up device of a fourth aspect is the sealing pump-up device of any one of the first aspect to the third aspect, wherein the opening diameter of the air supply port does not exceed 95% of the strand diameter of the O-ring.

The sealing pump-up device of a fifth aspect is the sealing pump-up device of any one of the first aspect to the fourth aspect, wherein an insertion guide face is formed to an end portion at the entrance side of the inner peripheral surface of the jig insertion hole, the insertion guide face being of a tapered shape narrowing in internal diameter from the entrance side toward the far side of the jig insertion hole.

Effect of the Invention

According to the sealing pump-up device of the present invention, damage can be effectively prevented to an O-ring fitted to the outer peripheral surface of a press jig due to catching on an air supply port at the inner peripheral surface of a jig insertion hole when the press jig is inserted into the jig insertion hole.

FIRST EXEMPLARY EMBODIMENT

Explanation will now be given of a sealing pump-up device according to a first exemplary embodiment of the present invention.

Configuration of the Sealing Pump-Up Device

Figure 1:
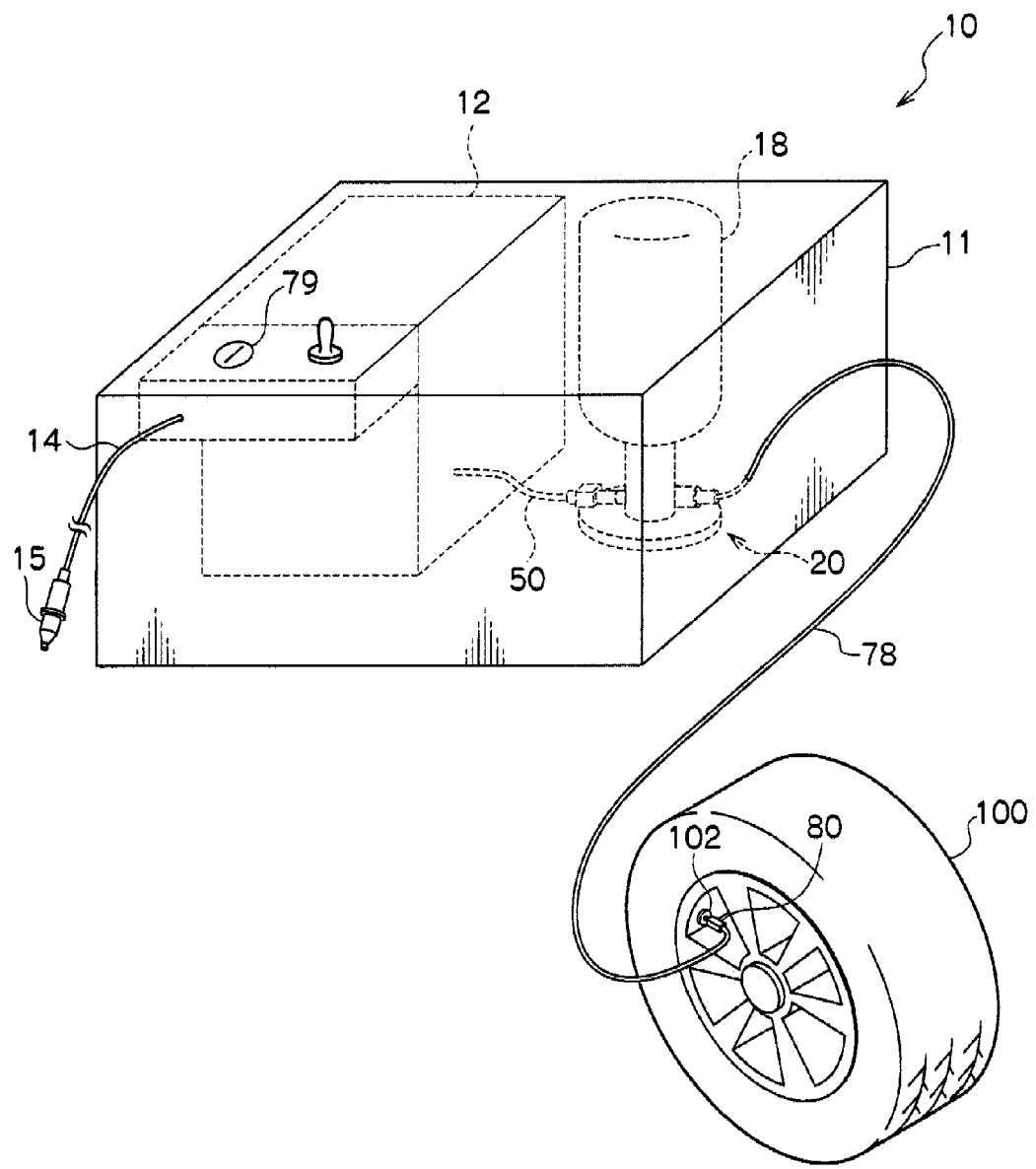
FIG. 1 is a perspective view showing the configuration of a sealing pump-up device according to an exemplary embodiment of the present invention.

A sealing pump-up device according to an exemplary embodiment of the present invention is shown in FIG. 1. A sealing pump-up device 10 is used when there is a puncture to a pneumatic tire (referred to below simply as tire) mounted to a vehicle such as an automobile, for repairing the tire with a sealing agent and re-pressurizing the tire up to the specified pressure (pump-up), without changing the tire or the wheel.

The sealing pump-up device 10, as shown in FIG. 1, is provided with a casing 11 as an external shell, and a compressor unit 12, an injection unit 20, and a liquid container 18, connected and fixed to the injection unit 20, are disposed within the casing 11.

A motor, air compressor, power circuit, control board and the like are disposed within the compressor unit 12, and a power supply cable 14 is also provided extending from the power circuit to outside the unit. Power supply by the battery mounted to a vehicle is possible to the motor etc. through the power circuit by inserting a plug 15 provided to the leading end portion of the power supply cable 14 into, for example, a socket of a cigarette lighter provided in the vehicle. The compressor unit 12 is capable of generating with the air compressor a higher pressure (for example 300 kPa or above) of compressed air than the pressure specified for each type of tire 100 requiring repair.

Figure 2:
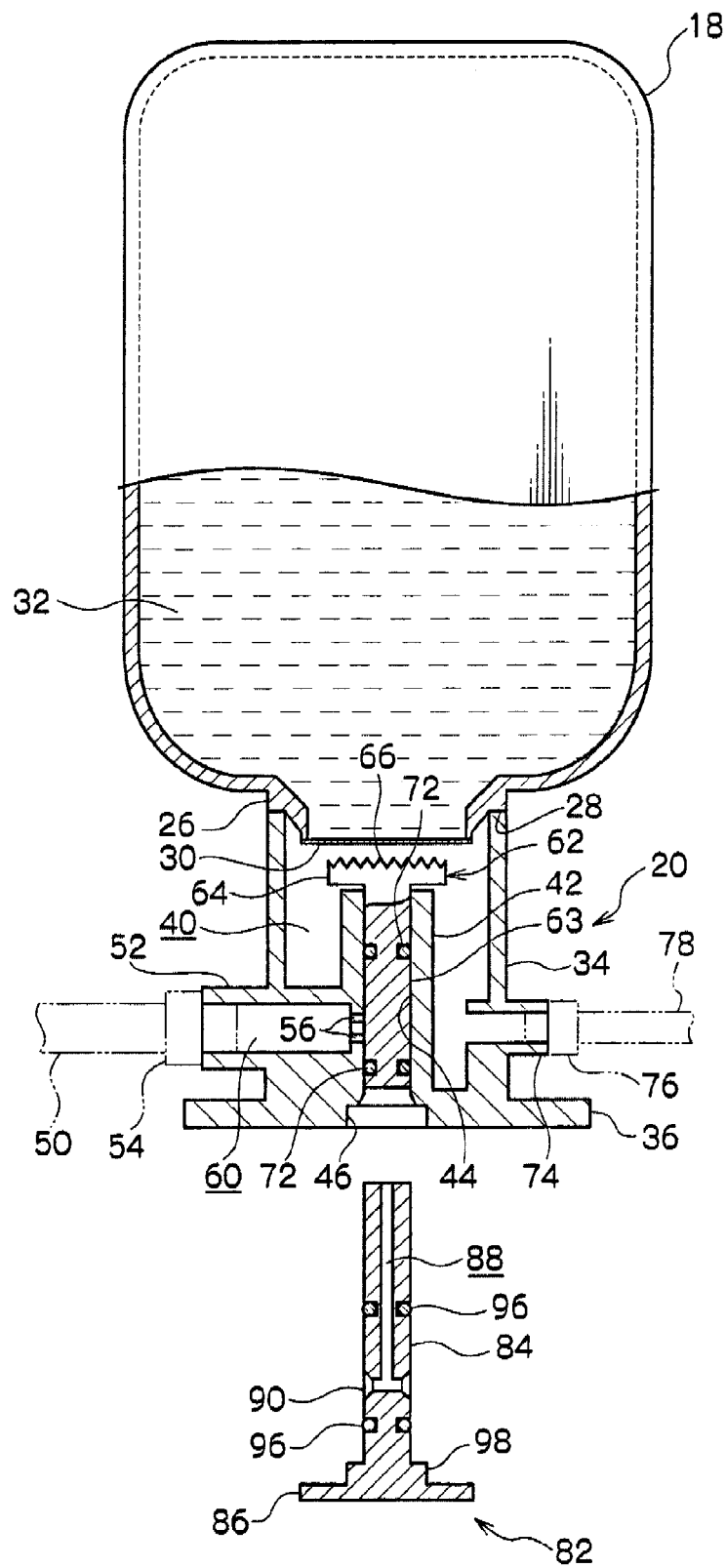
FIG. 2 is a cross-section of the sealing pump-up device shown in FIG. 1, showing the configuration of a liquid container, an injection unit and a press jig.

The sealing pump-up device 10, as shown in FIG. 2, is provided with a liquid container 18 in which is accommodated a sealing agent 32, and the injection unit 20 connected to the liquid container 18. A neck portion 26 is integrally formed in a substantially cylindrical shape at a bottom end portion of the liquid container 18, projecting out downward. The neck portion 26 is formed with a diameter narrower than that of a container body portion 22 at the top side above the neck portion 26. An aluminum seal 30 is disposed at the open end of the neck portion 26 in order to seal the sealing agent 32 inside the liquid container 18. The outer peripheral edge portion of the aluminum seal 30 is fixed around the entire periphery of the opening peripheral edge portion of the neck portion 26 with adhesive or the like. A step portion 28 is formed at an intermediate portion of the neck portion 26, so as to extend out towards the outer peripheral side.

The liquid container 18 is formed from a material capable of forming a gas barrier, such as various resin materials, or metallic materials such as aluminum alloys or the like. Slightly more sealing agent 32 is filled within the liquid container 18 than the standard amount (for example 200 g to 400 g) corresponding to the each type and size etc. of the tire 100 requiring repair by the sealing pump-up device 10. It should be noted that the liquid container 18 of the present exemplary embodiment is filled with no voids within the sealing agent 32 and without the provision of an air space, however in order to prevent deterioration by oxidation, nitration etc. of the sealing agent 32 a small amount of an inert gas such as Ar or the like may be sealed together with the sealing agent 32 within the liquid container 18 when filling.

When the sealing pump-up device 10 is in a state in which the liquid container 18 is positioned directly above the injection unit 20 the aluminum seal 30 of the liquid container 18 is in a pressure applied state due to the weight of the sealing agent 32 within the liquid container 18.

A unit main body portion 34 and a foot portion 36 are integrally provided in the injection unit 20, as shown in FIG. 2. The unit main body portion 34 is formed into a substantially circular bottomed cylinder shape open toward the top, and the foot portion 36 is of a circular flange shape extending to the outer peripheral side from the bottom portion of the unit main body portion 34. The bottom end side of the neck portion 26 of the liquid container 18 is inserted into the main body portion 34 at the inner peripheral side thereof, and the upper end face of the main body portion 34 is welded to the step portion 28 of the neck portion 26 using a method such as spin welding.

A substantially circular cylindrical shaped liquid supply pressure chamber 40 is provided within the main body portion 34, the liquid supply pressure chamber 40 being in communication with the inside of the liquid container 18 when the aluminum seal 30 is pierced. A circular cylindrical shaped inner peripheral tubular portion 42 is provided coaxially to the injection unit 20 at the inner peripheral side of the main body portion 34. A circular cross-section jig insertion hole 44 is formed at a central portion of the inner peripheral tubular portion 42, passing through from the bottom end face of the injection unit 20 to the top end face of the inner peripheral tubular portion 42. An insertion fitting recess portion 46 is formed as a circular shaped recess to a central portion of the bottom end face of the injection unit 20, with the internal diameter of the insertion fitting recess portion 46 being larger than the internal diameter of the jig insertion hole 44. The bottom face central portion of the insertion fitting recess portion 46 is thereby opened at the bottom end of the jig insertion hole 44.

Figures 4A, 4B:
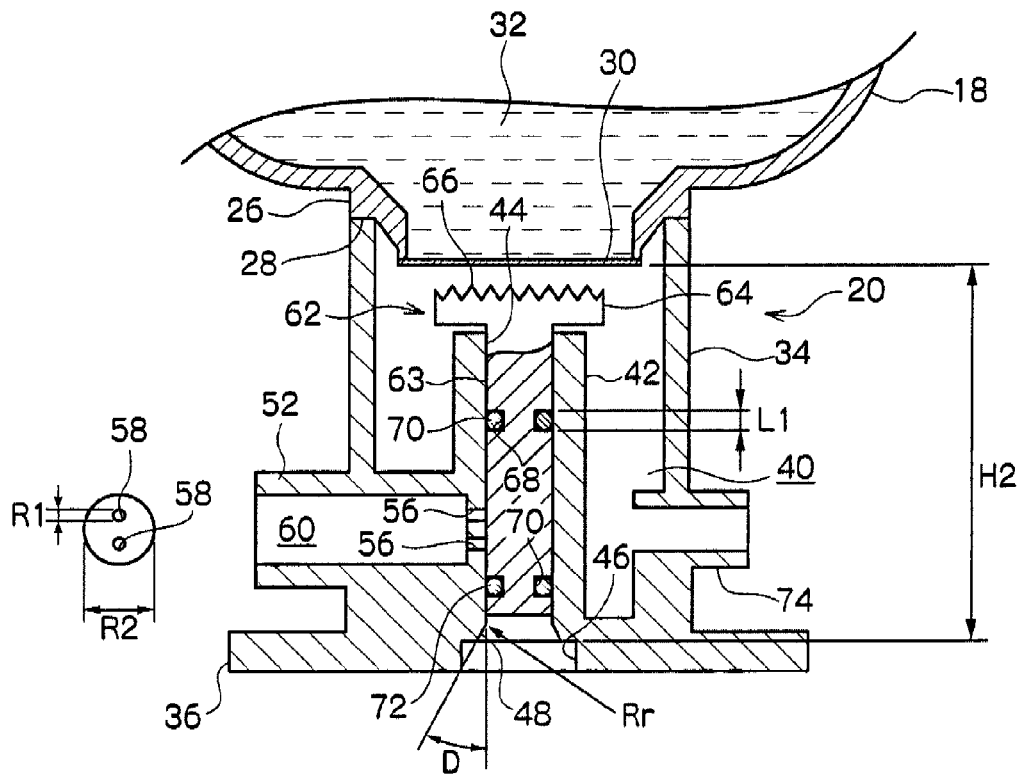
FIG. 4A is an expanded view of a liquid container, injection unit and press jig.
FIG. 4B is an expanded view of the liquid container, injection unit and press jig.

As shown in FIG. 4, an insertion guide face 48 is formed in a tapered shape to the inner peripheral surface of the jig insertion hole 44, with the internal diameter at the open end portion on the entry side reducing in diameter on progression from the open end further into the opening. The insertion guide face 48 is provided for guiding the leading end portion of a later described press jig 82 toward the far side of the jig insertion hole 44 when the press jig 82 is being inserted into the jig insertion hole 44.

There is a pressure hose 50 provided in the sealing pump-up device 10 extending from the compressor unit 12, as shown in FIG. 1, and the base end portion of the pressure hose 50 is connected to the air compressor within the compressor unit 12.

In the injection unit 20, as shown in FIG. 4, there is circular cylindrical shaped air supply tube 52 formed extending from the outer peripheral side of the inner peripheral tubular portion 42 and passing through the unit main body portion 34 toward the outer peripheral side. The leading end portion at the outer peripheral side of the air supply tube 52 is connected to the leading end of the pressure hose 50 through a nipple 54. Plural restricted portions 56 (two in the present exemplary embodiment) are provided at the base end portion of the air supply tube 52, piercing through the peripheral wall portion of the inner peripheral tubular portion 42 and communicating with the inside of the jig insertion hole 44.

The restricted portions 56 of the inner peripheral tubular portion 42 are formed as through holes each of circular cross-sectional shape, with a uniform internal diameter along the whole of their length, the internal diameter thereof being smaller than the internal diameter of the air supply tube 52. The inner peripheral edges of the restricted portions 56 are open to an intermediate portion of the inner peripheral surface of the inner peripheral tubular portion 42, and circular air supply port 58 are formed at the inner peripheral surface of the inner peripheral tubular portion 42.

The internal space within the pressure hose 50, the air supply tube 52 and the restricted portions 56 configures an air supply path 60 for supplying compressed air from the air compressor to the liquid container 18 or to the tire 100.

An axial portion 63 of the boring member 62 is inserted into the jig insertion hole 44 at the liquid supply pressure chamber 40 side. A circular flange shaped hole piercing portion 64 is provided spreading out radially to the outer peripheral side at the top end portion of the axial portion 63. Blade portions 66 are formed at the outer peripheral edge of the top face of the hole piercing portion 64, the blade portions 66 being formed in a series of protrusion shapes for readily rupturing the aluminum seal 30. An annular shaped fitting insertion groove 68 and annular shaped fitting insertion groove 70 are formed to the outer peripheral surface of the axial portion 63, at positions above and below air supply ports 58 when the axial portion 63 is in a state of having been inserted into the jig insertion hole 44. Rubber O-rings 72 are fitted into the fitting insertion grooves 68, 70.

When the axial portion 63 is in an inserted state into the jig insertion hole 44, the outer peripheral edge portions of each of the pair of O-rings 72 are in press contact along the entire circumference from the inner peripheral surface of the jig insertion hole 44. The jig insertion hole 44 is thereby in a closely sealed state, with above and below the air supply ports 58 closed off respectively by the axial portion 63 and the pair of O-rings 72. In this sate the axial portion 63 is retained within the jig insertion hole 44 by friction between the O-rings 72 and the inner peripheral surface of the jig insertion hole 44. In this state the leading end face of the hole piercing portion 64 directly faces the center of the aluminum seal 30, with there being a small gap between the hole piercing portion 64 and the aluminum seal 30.

A circular cylindrical shaped air-liquid supply tube 74 is integrally formed in the injection unit 20 so as to penetrate through the bottom end of the peripheral wall of the unit main body portion 34, as shown in FIG. 4. The base end portion of a joint hose 78 is connected through a nipple 76 to the leading end portion at the outer peripheral side of the air-liquid supply tube 74. A valve adapter 80, detachably connecting to a tire valve 102 of the tire 100, is provided at the leading end portion of the joint hose 78. The base end side of the air-liquid supply tube 74 is inserted into the liquid supply pressure chamber 40. The joint hose 78 is thereby in communication with the inside of the liquid supply pressure chamber 40 through the air-liquid supply tube 74.

Explanation will now be given of the press jig 82 when used to eject sealing agent 32 from the sealing pump-up device 10.

The press jig 82, as shown in FIG. 4, is provided with a bar shaped insertion portion 84 and a circular flange shaped base portion 86 formed to one end of the insertion portion 84. A jig communication path 88 is formed in the insertion portion 84, the jig communication path 88 extending from the leading end face toward the base portion 86 side, branching at an intermediate portion into plural branches (for example 2), with each branch extending out toward the outer peripheral side. An annular shaped communication groove 90 is formed in the outer peripheral surface of the insertion portion 84, forming an airway to the opening portions of the jig communication path 88.

A fitting insertion groove 92 and a fitting insertion groove 94 are formed respectively above and below the communication groove 90 in the outer peripheral surface of the insertion portion 84. O-rings 96 are respectively fitted into the pair of fitting insertion grooves 92, 94. The O-rings 96 used are of the same dimension and material as of the O-rings 72 disposed in the boring member 62.

Figure 3:
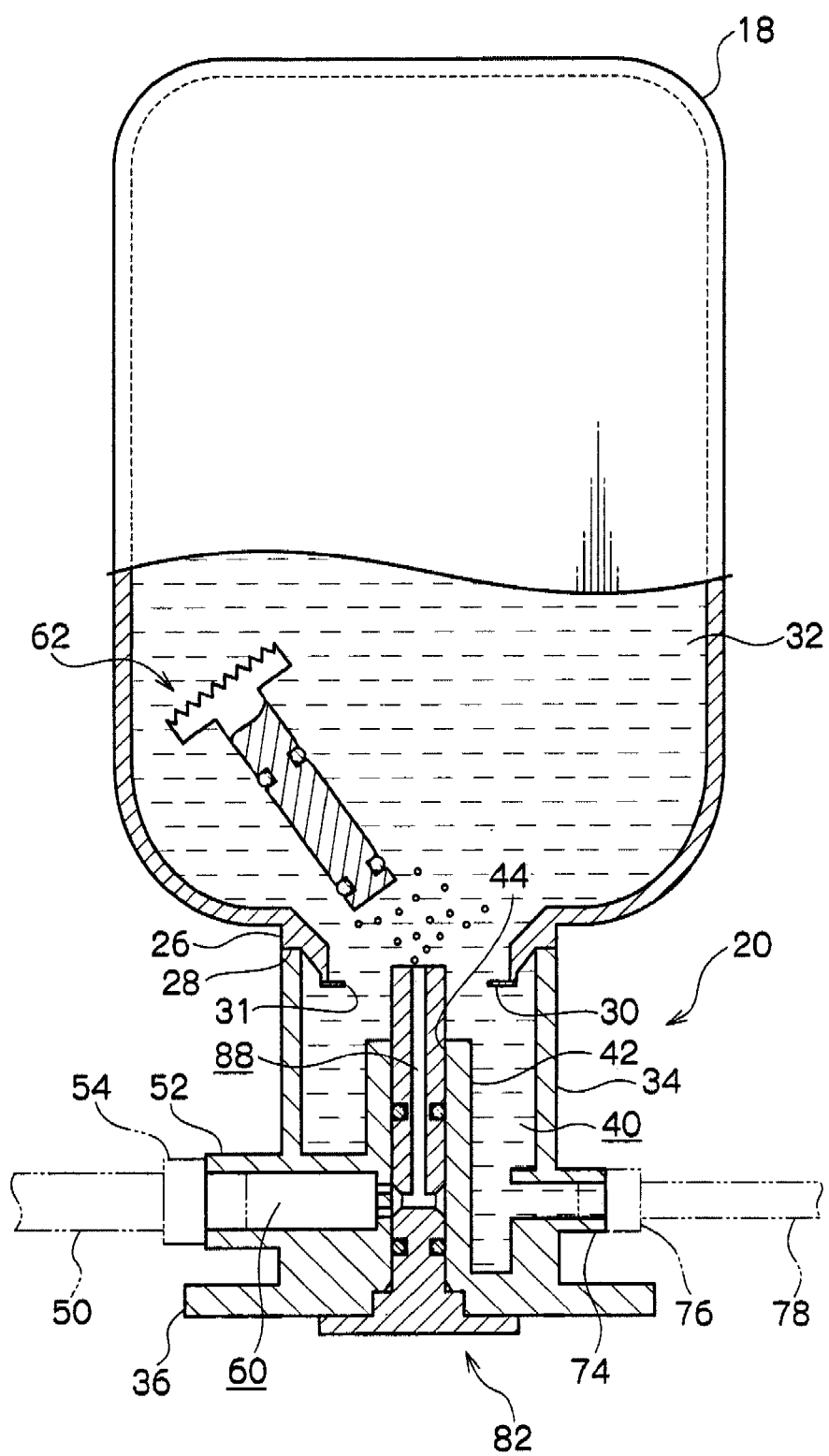
FIG. 3 is a cross-section showing a liquid container into which the press jig has been inserted, and the injection unit.

A fitting insertion projection portion 98 is integrally formed to the press jig 82, between the base end portion of the insertion portion 84 and the base portion 86 and with a diameter larger than that of the insertion portion 84. The fitting insertion projection portion 98 has an external diameter and height corresponding to the internal diameter and depth of the insertion fitting recess portion 46 formed in the bottom end face of the injection unit 20. Thereby, as shown in FIG. 3, the fitting insertion projection portion 98 fits inserted within the insertion fitting recess portion 46 when the whole of the insertion portion 84 is inserted within the jig insertion hole 44. The press jig 82 is retained by friction with the insertion portion 84 in an inserted state within the jig insertion hole 44 by the fitting insertion projection portion 98 being in a press-fit state insertion fitted within the insertion fitting recess portion 46.

The length H1 of the insertion portion 84 is slightly longer than the dimension H2 from the bottom end of the jig insertion hole 44 up to the aluminum seal 30, (see FIG. 4). Thereby, when the entire insertion portion 84 of the press jig 82 is inserted within the jig insertion hole 44, as shown in FIG. 3, the boring member 62 is securely pushed out from within the jig insertion hole 44, and pushed out into the liquid container 18. In addition a portion at the top end of the press jig 82 is inserted into the liquid container 18. In the state in which the entire insertion portion 84 is inserted within the jig insertion hole 44, the communication groove 90 of the insertion portion 84 and the air supply ports 58 are aligned with each other along the axial direction. The air supply path 60 is thereby in communication with the jig communication path 88 of the press jig 82 through the communication groove 90.

The outer peripheral edge portions of each of the pair of O-rings 96 are pressed along the entire circumferential direction against the inner peripheral surface of the jig insertion hole 44 when the insertion portion 84 is in the inserted state within the jig insertion hole 44. The jig insertion hole 44 is thereby in a closely sealed state with respectively above and below the air supply ports 58 closed off by the insertion portion 84 and the pair of O-rings 96.

In the sealing pump-up device 10, as shown in FIG. 4, if the strand diameters of the O-rings 72, 96 are each respectively designated L1, then the opening diameter R1 of the air supply ports 58 opening to the inner peripheral surface of the jig insertion hole 44 is set so as not to exceed 95% of L1.

In the sealing pump-up device 10 a relatively restricted internal diameter is formed at the inner peripheral tubular portion 42 by the restricted portions 56, relative to the internal diameter of the air supply tube 52, with the open end of these restricted portions being the air supply ports 58, with the opening diameter R1 of the air supply ports 58 smaller than the strand diameter L1 of the O-rings 72, 96. However, a configuration may be made in which the internal diameter of the air supply path 60 provided at the inner peripheral side of the air supply tube 52 is of a smaller diameter than the strand diameter L1 along the entire length of the air supply path 60, thereby making the internal diameter of the air supply port opening to the inner peripheral surface of the inner peripheral tubular portion 42 smaller than the strand diameter L1.

Operation of the Sealing Pump-Up Device

Explanation will now be given of the operational sequence for repairing the punctured tire 100 using the sealing pump-up device 10 according to the first exemplary embodiment.

When a puncture occurs in the tire 100, the operator first screws the valve adapter 80 of the joint hose 78 onto the tire valve 102 of the tire 100, making the liquid supply pressure chamber 40 communicate with the inside of the tire 100 through the joint hose 78.

The operator then inserts the insertion portion 84 of the press jig 82 into the jig insertion hole 44 of the sealing pump-up device 10, and the base portion 86 of the press jig 82 abuts the foot portion 36 of the injection unit 20, and also the fitting insertion projection portion 98 of the press jig 82 is pressed into the insertion fitting recess portion 46 of the injection unit 20. Thereby the hole piercing portion 64, of the boring member 62 pressed by the insertion portion 84, ruptures the aluminum seal 30 and is pushed into the container, and the insertion portion 84 progresses into the container.

When this occurs the press jig 82 moves the insertion portion 84 from the end portion at the entrance deeper into the jig insertion hole 44, while the pair of O-rings 72 disposed on the outer peripheral surface of the insertion portion 84 press against the inner peripheral surface of the jig insertion hole 44. Part-way through this movement the O-ring 96 disposed at the top side of the insertion portion 84 passes by on the inner peripheral side of the air supply ports 58. The boring member 62 also moves the axial portion 63 from within the jig insertion hole 44 to the exit side, while the pair of O-rings 72 disposed on the outer peripheral surface of the axial portion 63 press against the inner peripheral surface of the jig insertion hole 44. Part-way through this movement the O-ring 72 disposed at the bottom side of the axial portion 63 passes by on the inner peripheral side of the air supply ports 58.

Then the sealing pump-up device 10 is placed, for example, on a road surface, with the foot portion 36 at the bottom and the liquid container 18 at the top.

When the insertion portion 84 of the press jig 82 is inserted into the jig insertion hole 44 of the injection unit 20, as shown in FIG. 3, the leading end portion of the insertion portion 84 protrudes out from the leading end of the inner peripheral tubular portion 42, directly facing a hole 31 opened in the aluminum seal 30 by the boring member 62. The sealing agent 32 in the liquid container 18 thereby flows out into the liquid supply pressure chamber 40 through the hole 31.

The compressor unit 12 is started in the state shown in FIG. 3, namely with injection unit 20 and the liquid container 18 held with the liquid container 18 positioned above the injection unit 20. Compressed air generated by the compressor unit 12 is supplied through the air supply path 60 and the jig communication path 88 into the liquid container 18.

When compressed air is supplied into the liquid container 18 the compressed air rises above the sealing agent 32 within the liquid container 18 and forms an air space (air layer) above the sealing agent 32 in the liquid container 18. The sealing agent 32 pressured by the air pressure from the air layer is supplied through the hole 31 opened in the aluminum seal 30 to within the liquid supply pressure chamber 40, and injected from within the liquid supply pressure chamber 40 into the pneumatic tire 100 through the joint hose.

After all of the sealing agent 32 within the liquid container 18 has been expelled the pressurized sealing agent 32 within the liquid supply pressure chamber 40 is supplied into the pneumatic tire 100 through the joint hose 78. When all of the sealing agent 32 is ejected from the liquid supply pressure chamber 40 and the joint hose 78, compressed air is injected into the tire 100 through the liquid container 18, the liquid supply pressure chamber 40, and the joint hose 78.

The compressor unit 12 is stopped when the operator has confirmed, using a pressure gauge 79, that the specified internal pressure of the tire 100 has been reached and the valve adapter 80 is removed from the tire valve 102.

Within a specific period of time after finishing inflating the tire 100 the operator carries out preparatory running of the tire by traveling a specific distance using the sealing agent 32 injected tire 100. The sealing agent 32 within the tire 100 thereby spreads out uniformly, the sealing agent 32 fills the puncture hole and seals the puncture hole. The internal pressure of the tire 100 is re-measured after completing preparatory running, and if necessary the valve adapter 80 of the joint hose 78 is screwed again onto the tire valve 102, the compressor unit 12 is re-operated and the tire 100 pressurized to the specified internal pressure. Puncture repair of the tire 100 is thereby completed and it is possible to drive using the tire 100 within a specific distance range while not exceeding a specific speed (for example not exceeding 80 km/h).

In the sealing pump-up device 10 of the present exemplary embodiment, by the O-rings 96 being respectively fitted into fitting insertion grooves 92, 94 the space between the outer peripheral surface of the insertion portion 84 and the inner peripheral surface of the jig insertion hole 44 is sealed in a state in which the insertion portion 84 of the press jig 82 is inserted within the jig insertion hole 44. Consequently compressed air supplied from the air supply ports 58 can be effectively prevented from leaking out to within the liquid container 18 through the space between the outer peripheral surface of the insertion portion 84 and the inner peripheral surface of the jig insertion hole 44, and sealing agent 32 can be effectively prevented from leaking out from within the liquid container 18 to outside of the unit body.

In the sealing pump-up device 10 the opening diameter of the air supply ports 58, provided at one end of the air supply path 60 and opening to the inner peripheral surface of the jig insertion hole 44, is smaller than the strand diameter of the O-rings 72 and the O-rings 96. The width of the edge of the air supply ports 58 that the O-rings 72, 96 may possibly be caught on can thereby be made sufficiently smaller than the strand diameter of the O-rings 72, 96. When the O-rings 72, 96 pass by on the inner peripheral side of the air supply ports 58 in a state of press contact with the inner peripheral surface of the jig insertion hole 44, the amount by which the O-rings 72, 96 are deformed (restored) in order to swell to the outer peripheral side so that a portion thereof fits into the air supply ports 58, can be reduced sufficiently.

As a result, when the insertion portion 84 of the press jig 82 is inserted into the jig insertion hole 44 the O-ring 96 fitted to the top side of the insertion portion 84 can be effectively prevented from catching on the edge of the air supply ports 58 formed on the inner peripheral surface of the jig insertion hole 44, and prevented from causing damage such breakage of the top O-ring 96. In addition when the axial portion 63 of the boring member 62 is pushed out from within the jig insertion hole 44 by the insertion portion 84 of the press jig 82, the O-ring 72 fitted to the bottom side of the axial portion 63 can be effectively prevented from catching on the edge of the air supply ports 58 formed on the inner peripheral surface of the jig insertion hole 44, and prevented from causing damage such breakage of the top O-ring 72.

While varying depending on the type of rubber the O-rings 72, 96 are made from, the opening diameter R1 of the air supply ports 58 preferably do not exceed 95% of the strand diameter L1 of the O-rings 72, 96 in order to secure the preventative effect of stopping the O-rings 72, 96 from catching on the edge of the air supply ports 58 formed to the inner peripheral surface of the jig insertion hole 44.

In the sealing pump-up device 10 the insertion guide face 48 is formed in a taper shape to the end portion on the entrance side to the jig insertion hole 44. When the insertion portion 84 of the press jig 82 is inserted into the jig insertion hole 44 and moves, the O-rings 96 fitted at the top and bottom sides of the insertion portion 84 can be effectively prevented from catching on the end portion on the entrance side of the inner peripheral surface of the jig insertion hole 44 and causing damage such as breakage of the top and bottom O-rings 96.

EXAMPLES

Specific Examples

An example is given of the dimensions of each portion of the injection unit 20, fitting insertion groove 92, and the press jig 82 in the sealing pump-up device 10 of the present exemplary embodiment as explained above.

As shown in FIG. 4, D is the angle of inclination of the insertion guide face 48, Rr is the radius of curvature of the interface between the insertion guide face 48 and the jig insertion hole 44, R1 is the opening diameter of the air supply ports 58, R2 is the internal diameter of the jig insertion hole 44, R3 is the external diameter of the insertion portion 84 of the press jig 82, R4 is the external diameter of the bottom face of the fitting insertion groove 92, 94 of the insertion portion 84, and L1 is the strand diameter of the O-rings 72, 96.

The dimensions of each portion described above are, for example, set as follows.
Angle of inclination D=30°
Radius of curvature Rr=1±0.1 mm
Opening diameter R1=1.5±0.1 mm
Internal diameter R2=9.0±0.1 mm
External diameter R3=8.8±0.1 mm
External diameter R4=5.9±0.1 mm
Strand diameter L1=1.9±0.1 mm Test Examples Tests in which O-rings 96 of strand diameter L1=1.9±0.1 mm were fitted to the press jig 82 were out carried with varied ambient temperature (−30° C., 20° C., and 70° C.), and the press jig 82 was inserted into the jig insertion hole 44 while changing the opening diameter R1 of the air supply ports 58 in stages from 0.5 mm to 4.0 mm. The results thereof are shown in FIG. 1.

Table 1 shows the evaluation (evaluation reference: A, B and C) of the state of the O-ring 96 on the upper side after insertion, with evaluation reference A indicating that after insertion no visible damage to the O-ring 96 had occurred, evaluation reference B indicating that after insertion some slight visible damage had occurred to the O-ring 96, but of a level that would not affect the sealing ability thereof, and evaluation reference C indicating that after insertion visible damage that would affect the sealing ability had occurred to the O-ring 96.

Note that with the NBR O-ring 96 the insertion portion 84 could not be inserted into the jig insertion hole 44 due to the effect of the hardness thereof below −20° C. There are therefore no evaluation references shown in the corresponding column thereto.

TABLE 1

| Opening Diameter | Evaluation Test 1 (−30° C.) | | | Evaluation Test 2 (20° C.) | | | Evaluation Test 3 (70° C.) | | |
|---|---|---|---|---|---|---|---|---|---|
| R1 | NBR | EPDM | Silicone | NBR | EPDM | Silicone | NBR | EPDM | Silicone |
| 0.5 | — | A | A | A | A | A | A | A | A |
| 1.0 | — | A | B | A | A | A | A | A | A |
| 1.5 | — | A | B | A | A | B | A | A | A |
| 2.0 | — | A | C | A | A | C | A | A | A |
| 2.5 | — | A | C | A | A | C | A | A | A |
| 3.0 | — | B | C | A | A | C | A | A | B |
| 4.0 | — | C | C | C | B | C | B | A | B |

The invention claimed is:

1. A sealing pump-up device comprising:
a liquid container for storing a sealing agent, the liquid container also formed with an ejection port for ejecting the sealing agent;
an injection unit configured with a liquid supply chamber that is in communication with the ejection port and is on the opposite side of the ejection port to the inside of the liquid container, with the ejection port interposed between the liquid supply chamber and the liquid container;
a jig insertion hole configured in the injection unit and in communication with the outside of the injection unit and with the liquid supply chamber;
an air supply path configured with a first end opening so as to face inside the jig insertion hole and with the other end connected to an air supply source for supplying compressed air;
an air-liquid supply tube with a first end connected to the liquid supply chamber and the other end connectable to a valve of a pneumatic tire;
a press jig of a pillar shape, movable within the jig insertion hole of the injection unit;
a jig communication passage configured in the press jig, with a first end opening at the leading end side of the press jig and another end opening at the outer peripheral surface of the press jig, when the press jig moves within the jig insertion hole the first end being in communication with the inside of the liquid container and the other end being connected to the air supply path;
an O-ring, fitting to a groove formed at the leading end side of the outer peripheral surface of the press jig and sealing between the outer peripheral surface of the press jig and the inner peripheral surface of the jig insertion hole when the press jig is in an inserted state within the jig insertion hole;
an air supply port provided to the first end of the air supply path, opening to the inner peripheral surface of the jig insertion hole and also being of an opening diameter smaller than a strand diameter of the O-ring.

2. The sealing pump-up device of claim 1, wherein the internal diameter of the other end side of the air supply path is made bigger in diameter than the O-ring strand diameter, and also a restricted portion is provided to the first end of the air supply path to reduce the internal diameter relative to the other end side of the air supply path, the air supply port being at a first end of the restricted portion.

3. The sealing pump-up device of claim 2, wherein a plurality of the restricted portions are provided at the first end of the air supply path, and one of the air supply ports is provided at each of the first ends of the plurality of restricted portions.

4. The sealing pump-up device of claim 1, wherein the opening diameter of the air supply port does not exceed 95% of the strand diameter of the O-ring.

5. The sealing pump-up device of claim 1, wherein an insertion guide face is formed to an end portion at the entrance side of the inner peripheral surface of the jig insertion hole, the insertion guide face being of a tapered shape narrowing in internal diameter from the entrance side toward the far side of the jig insertion hole.

6. The sealing pump-up device of claim 2, wherein the opening diameter of the air supply port does not exceed 95% of the strand diameter of the O-ring.

7. The sealing pump-up device of claim 3, wherein the opening diameter of the air supply port does not exceed 95% of the strand diameter of the O-ring.

8. The sealing pump-up device of claim 2, wherein an insertion guide face is formed to an end portion at the entrance side of the inner peripheral surface of the jig insertion hole, the insertion guide face being of a tapered shape narrowing in internal diameter from the entrance side toward the far side of the jig insertion hole.

9. The sealing pump-up device of claim 3, wherein an insertion guide face is formed to an end portion at the entrance side of the inner peripheral surface of the jig insertion hole, the insertion guide face being of a tapered shape narrowing in internal diameter from the entrance side toward the far side of the jig insertion hole.

10. The sealing pump-up device of claim 4, wherein an insertion guide face is formed to an end portion at the entrance side of the inner peripheral surface of the jig insertion hole, the insertion guide face being of a tapered shape narrowing in internal diameter from the entrance side toward the far side of the jig insertion hole.

* * * * *